United States Patent
Pavadai et al.

(10) Patent No.: US 12,513,113 B2
(45) Date of Patent: Dec. 30, 2025

(54) ROUTE ADAPTIVE INTELLIGENT TRAFFIC OFFLOADING

(71) Applicant: Palo Alto Networks, Inc., Santa Clara, CA (US)

(72) Inventors: Ramesh Pavadai, San Ramon, CA (US); Yegappan Lakshmanan, Union City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 89 days.

(21) Appl. No.: 18/389,945

(22) Filed: Dec. 20, 2023

(65) Prior Publication Data
US 2025/0211570 A1   Jun. 26, 2025

(51) Int. Cl.
*H04L 9/40* (2022.01)
*H04L 45/00* (2022.01)

(52) U.S. Cl.
CPC .......... *H04L 63/0236* (2013.01); *H04L 45/38* (2013.01); *H04L 63/0263* (2013.01)

(58) Field of Classification Search
CPC .. H04L 63/0236; H04L 45/38; H04L 63/0263
USPC .......................................................... 726/11
See application file for complete search history.

(56) References Cited

U.S. PATENT DOCUMENTS

2023/0421490 A1* 12/2023 Mendez .................. H04L 45/70

* cited by examiner

Primary Examiner — Lan Dai T Truong
(74) Attorney, Agent, or Firm — Gilliam IP PLLC

(57) ABSTRACT

A host with a firewall and an offload device can be configured/programmed to balance security and cost. Services are instantiated on the firewall and on the offload device. The service on the firewall maintains data for offloaded flows that indicate the next-hops for the offloaded flows when offloaded. The service on the offload device periodically copies samples from offloaded flows and communicates the samples to the service on the firewall. The service on the firewall determines a next-hop for the copied samples according to the firewall's routing information. If the determined next-hop has changed from what is indicated in the offloaded flows data, then the service on the firewall updates the offloaded flows data and communicates the next-hop change to the service on the offload device which causes an update to the flow table on the offload device for relevant offloaded flows.

20 Claims, 5 Drawing Sheets

ROUTE ADAPTIVE INTELLIGENT TRAFFIC OFFLOADING

BACKGROUND

The disclosure generally relates to transmission of digital information (e.g., CPC subclass H04L) and to arrangements for administration or management of switching networks (e.g., CPC subclass H04L 41/00).

A forwarding information base or forwarding table includes information to forward an Internet Protocol (IP) datagram, usually in a bridge or switch. The minimal information in an entry for forwarding an IP datagram is an incoming interface identifier, a network prefix, an outgoing interface identifier, and next hop information. This information is a subset of the information in a routing information base or routing table and is copied to the forwarding table. The forwarding table is then used for packet forwarding.

For a software defined network (SDN), flow tables are used for packet forwarding. Each entry in a flow table includes a matching field, an action field, and a statistics field. The matching field indicates packet attributes or packet header information for matching a packet to a flow. The matching criteria for a flow define a communication session. Examples of matching criteria include 3- and 5-tuple matching criteria for flow classification/identification. A 5-tuple for flow identification/classification includes source IP address, source Transmission Control Protocol (TCP)/User Datagram Protocol (UDP) port, destination IP address, destination TCP/UDP port, and IP protocol. A 3-tuple for flow classification would include source IP address, destination IP address, and IP protocol. The action field indicates how to handle a matching packet (e.g., forward to a specified port or interface, drop, etc.). The statistics field is used to maintain statistics (e.g., number of packets, number of byes) for a flow.

BRIEF DESCRIPTION OF THE DRAWINGS

Embodiments of the disclosure may be better understood by referencing the accompanying drawings.

DESCRIPTION

Figure 1:
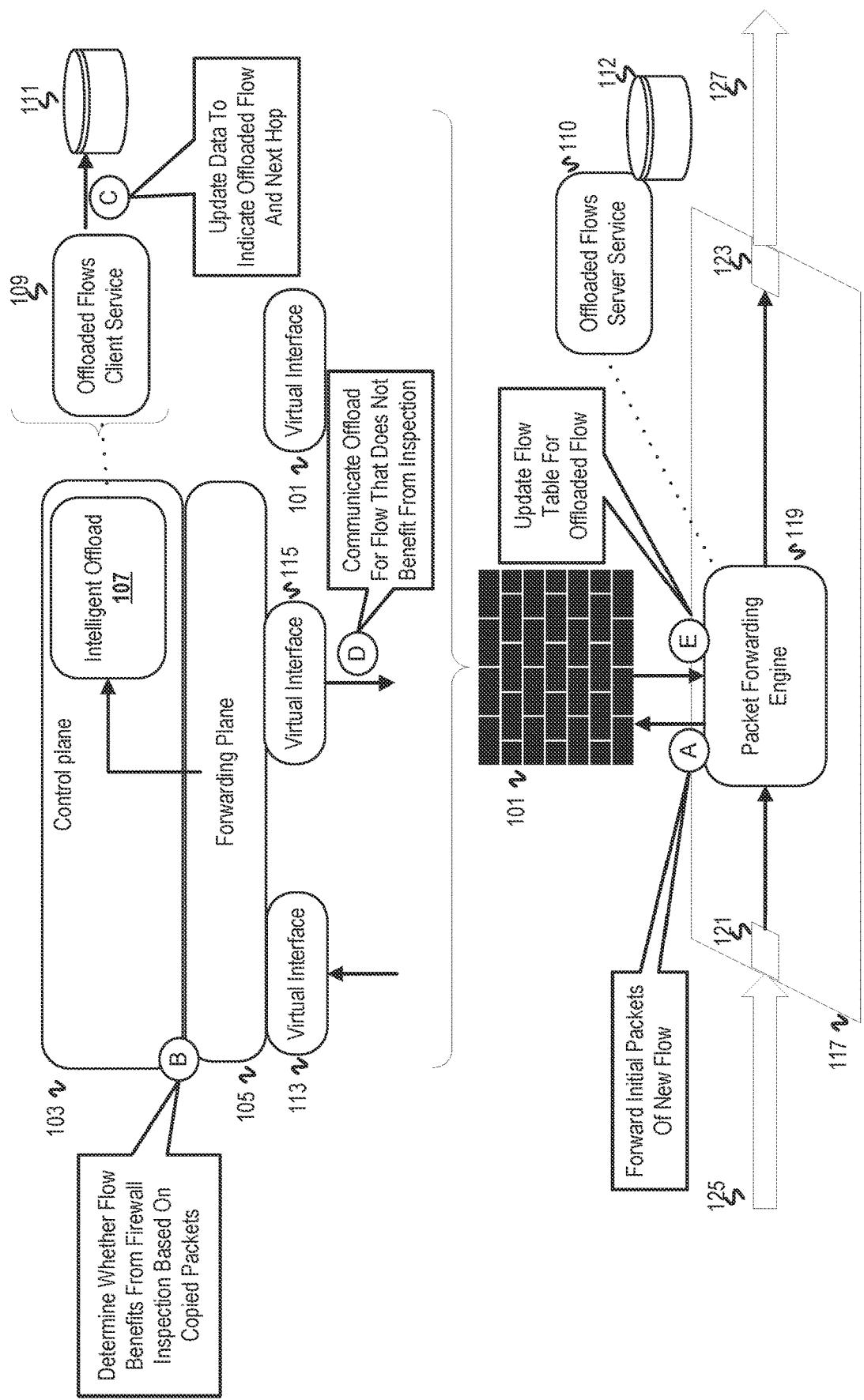
FIG. 1 is a diagram of the host maintaining data that tracks offloaded network traffic flows.

The description that follows includes example systems, methods, techniques, and program flows to aid in understanding the disclosure and not to limit claim scope. Well-known instruction instances, protocols, structures, and techniques have not been shown in detail for conciseness.

Terminology

This description will describe an entity as being on a firewall, which is a virtual or software firewall. Describing an entity as being "on" the firewall refers to the entity being instantiated and/or operating in a memory space or execution space allocated or owned by the firewall.

Hyperscaler is a term that refers to a large cloud service provider that provides enterprise scale services, such as storage and computing services. What qualifies as a "large" cloud service provider is not explicitly defined, but can be approximated by the cloud service provider using resources sufficient to serve multiple enterprise customers as well as numerous smaller customers.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Introduction

Some but not all network traffic that traverses the networks and/or data centers of hyperscalers benefit from security inspection. For instance, the majority of network traffic within an enterprise network can be decrypted and inspected. In contrast, the majority of network traffic in a hyperscaler environment, such as a service provider transit network, cannot be decrypted (e.g., the hyperscaler does not have the keys) or need not be decrypted and inspected (e.g., streaming media traffic may not benefit from inspection). The hyperscalers still deploy firewalls to inspect the portion of network traffic that can benefit from security inspection. While this inspection does not introduce significant latency at an individual firewall granularity, the volume of firewalls deployed and volume of network traffic observed by a hyperscaler introduces noticeable overhead. Deploying firewalls to inspect a small portion of network traffic can become cost prohibitive and lead to non-ideal tradeoffs between cost and security. Therefore, offloading was implemented. Deployments of virtualized firewalls in conjunction with offload devices (e.g., data processing units or smart network interface card (SmartNIC)) selectively inspect network traffic by the firewall and offload to the offload device network traffic not selected for inspection.

Overview

Offloading network traffic to an offload device preserves security while mitigating cost, but the offloaded network traffic can be susceptible to routing changes. In particular, long lived network traffic flows (e.g., elephant flows) that have been offloaded will live long enough to experience a route change. This can lead to packets of the flow being transmitted over an inefficient path or transmitted to a black hole if the next-hop was moved or taken offline. A solution has been created that propagates routing changes impacting offloaded flows to an offload device. Services are instantiated on the firewall and on the offload device. The service on the firewall maintains data for offloaded flows that indicate the next-hops for the offloaded flows when offloaded. The service on the offload device periodically copies samples from offloaded flows and communicates the samples to the service on the firewall. The service on the firewall determines a next-hop for the copied samples according to the firewall's routing information. If the determined next-hop has changed from what is indicated in the offloaded flows data, then the service on the firewall updates the offloaded flows data and communicates the next-hop change to the service on the offload device which causes an update to the flow table on the offload device for relevant offloaded flows. This communication of next-hop changes for offloaded flows adapts to routing changes while preserving traffic throughput without traffic disruption.

Example Illustrations

Figure 2:
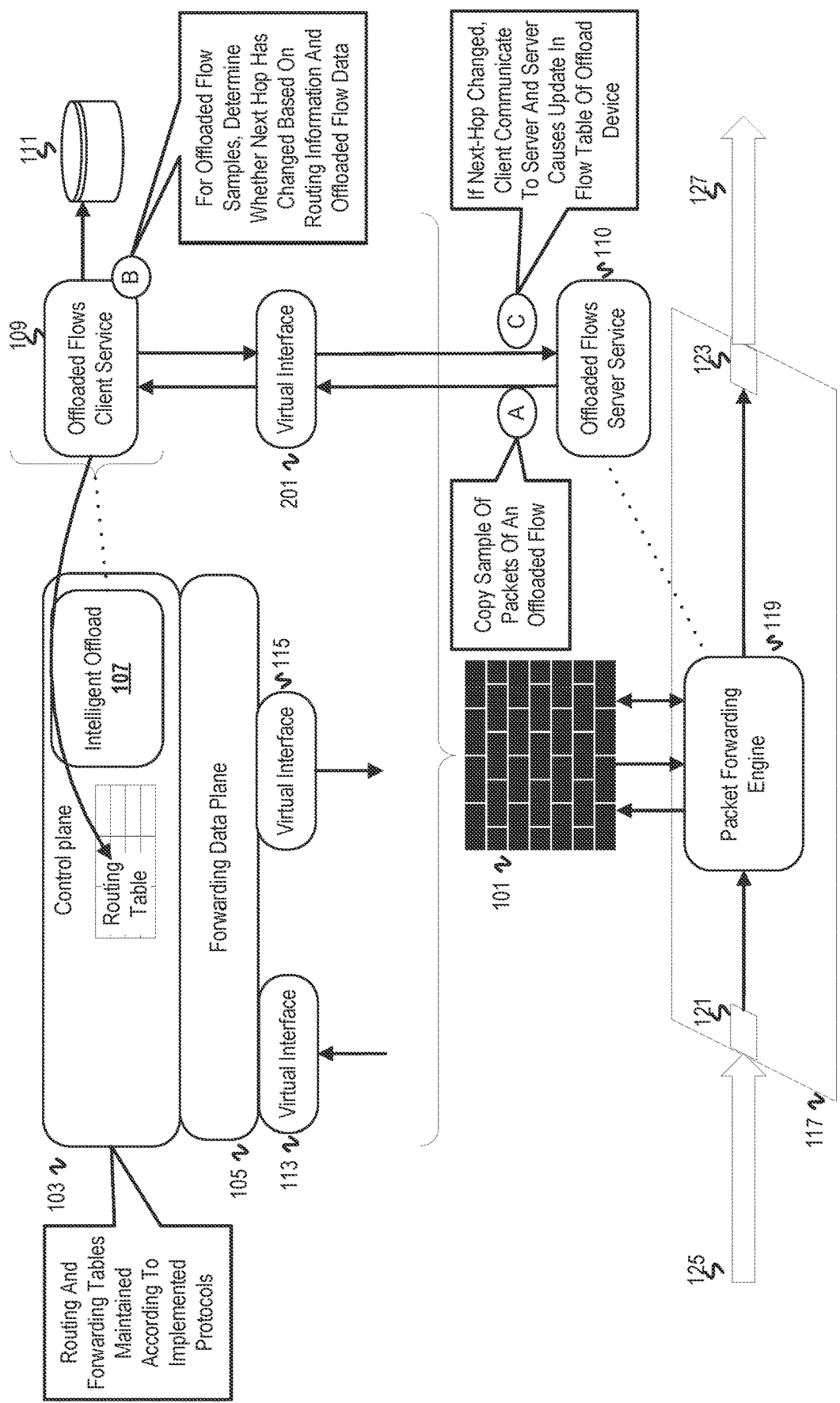
FIG. 2 is a diagram of the host communicating next-hop changes for offloaded flows to the offload device.

FIGS. 1-2 are diagrams of a host with a firewall and offload device handling network traffic including offloaded network traffic flows. Both Figures depict a firewall 101 and an offload device 117. The firewall 101 is a virtualized or software firewall. The offload device 117 may be a Smart-NIC or system on a chip (e.g., data processing unit (DPU)). The firewall 101 includes a control plane 103 and a forwarding plane 105. The offload device 117 includes a packet forwarding engine 119. The packet forwarding engine 119 is a combination of hardware and software on the offload device 117 to implement a forwarding plane. Within the control plane 103 is an intelligent offload component 107. The intelligent offload component 107 determines whether a network traffic flow benefits from security inspection by examining packets sampled from the network traffic flow, such as the first few packets of the flow. The intelligent offload component 107 makes the determination based on a security policy and attributes of the network traffic flow. Examples of attributes relevant to the determination can include an application identifier, a decryption policy, and a capability to decrypt the packets.

FIG. 1 is a diagram of the host maintaining data that tracks offloaded network traffic flows. The intelligent offload component 107 includes an offloaded flows client service 109. The intelligent offload component 107 can be a sub-program of the firewall 101 or thread/process instantiated by the firewall 101. The intelligent offload component 107 instantiates the offloaded flows client service 109 on the firewall 101 and an offloaded flows server service 110 on the offload device 117.

FIG. 1 is annotated with a series of letters A-E each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the offload device 117 forwards initial packets from each flow to the firewall 101. The host of the firewall 101 and the offload device 117 receives network traffic 125 at a network interface 121 of the offload device 117. The packet forwarding engine 119 differentiates flows within the network traffic 125. For each new flow, the packet forwarding engine 119 forwards the initial packets (e.g., the first few packets) of the flow to the firewall 101 via a virtual interface 113. For a flow that is not new to the packet forwarding engine 119, the packet forwarding engine 119 will process the traffic according to a flow table maintained in the packet forwarding engine 119.

At stage B, the firewall 101 determines whether a flow benefits from firewall inspection based on the sampling of packets from the offload device 117. The forwarding plane 105 determines whether a flow table maintained in the forwarding plane 105 indicates how to process the packets. If not, the forwarding plane 105 passes the packets to the control plane 103. The control plane 103 analyzes the packets to identify an application and/or a security policy applicable to the flow corresponding to the packets. In addition, the control plane 103 determines a path for the flow and updates the forwarding plane 105 accordingly. This update at least includes a next-hop for the flow based on the determined path/route. With the information gathered from the analysis related to inspection, the intelligent offload component 107 determines whether the flow represented by the sampled packets can benefit from inspection. For instance, the offload component 107 determines whether the packets can be sufficiently decrypted for deep packet inspection. If the represented flow can benefit from inspection, the offload device will continue to process packets of the flow according to a default entry to forward packets to the firewall 101. Thus, the control plane 103 does not modify the default entry in the flow table of the forwarding plane 105 since the secure default is to presume inspection. If the flow will not benefit from inspection, then the flow is offloaded.

For a flow deemed to not benefit from inspection, the intelligent offload component 107 causes the offloaded flows client service 109 to update data in a store 111 (e.g., cache or memory accessible by the offloaded flows client service 109) in which data is maintained to track offloaded flows, at stage C. The offloaded flows client service 109 updates the store 111 to indicate each newly offloaded flow and corresponding next-hop. This data is arranged to allow accessing of next-hop by flow identifier and accessing flow identifiers with a common next-hop by the next-hop identifier.

At stage D, the firewall 101 communicates offloading of a flow(s) that does not benefit from inspection via a virtual interface 115 to the packet forwarding engine 119. The virtual interface 115 is configured to carry inspected network traffic and control messages to the packet forwarding engine 119 from the firewall 101. For packets of an offloaded flow, the firewall 101 will instruct the packet forwarding engine 119 to forward packets of the flow received via the network interface 121 to a next-hop determined by the firewall 101. In addition, the offloaded flows server service 110 will update a data store 112 to indicate the offloaded flows. For instance, the offloaded flows server service 110 will update the data store 112 (e.g., a memory space allocated to the offloaded flows server service 110) to indicate a flow identifier and metadata of the offloaded flow. Examples of offloaded flow metadata include the next-hop, time off offload, a session identifier, etc.

At stage E, the packet forwarding engine 119 updates its flow table for the offloaded flows. The packet forwarding engine 119 updates its flow table to forward offloaded flows from an incoming interface, such as network interface 121, according to the next-hop(s) of the offloaded flows determined by the firewall 101. The packet forwarding engine 119 will have each next-hop bound to an outgoing interface, such as a network interface 123 to convey outgoing network traffic 127, also referred to as returning traffic to the network.

FIG. 2 is a diagram of the host communicating next-hop changes for offloaded flows to the offload device. The stages depicted in FIG. 2 are stages A-C. The control plane 103 maintains routing and forwarding/flow tables according to the networking protocols implemented by the firewall 101. This is not depicted with a stage since the routing, inspecting, and forwarding are ongoing and receipt of updates or announcements affecting routes is asynchronous with respect to the depicted operations. For example, a network stack of the firewall 101 determines that a neighboring node is no longer available or has a link performance degradation that leads to a change to a different neighboring node. The information can be from a neighboring node or from a SDN controller. Stages A-C correspond to the mechanism for propagation of next-hop changes from the firewall 101 to the offload device 117. The communications between services 109, 110 are via a virtual interface 201. After the services 109, 110 are instantiated, the virtual interface 201 is configured for the services 109, 110 to communicate with each other.

At stage A, the offloaded flows server service 110 periodically copies a sample of packets of an offloaded flow. The offloaded flows server service 110 communicates the copied packets via the virtual interface 201 to the offloaded flows client service 109. For instance, the offloaded flows server service 110 can cause the offload device 117 to mirror a packet(s) of an identified flow to the firewall 101 via the virtual interface 201. The offloaded flows server service 110 can select an offloaded flow and invoke a function with an identifier of the selected flow and an identifier of the virtual interface 201 to cause the offload device to look up the flow and perform a mirror action to the interface 201, for example.

At stage B, the offloaded flows client service 109 determines whether the next-hop for the offloaded flow of the copied packets has changed based on routing information of the firewall 101 and the offloaded flow data in the data store 111. The offloaded flows client service 109 examines the packet headers to determine a destination address. With the destination address, the offloaded flows client service 109 looks up a next-hop in the routing table maintained in the control plane 103. The offload flows client service 109 also looks up an entry in the data in the store 111 to determine whether the next-hop has changed.

If the offloaded flows client service 109 determines that the next-hop has changed for the offloaded flow, then the offloaded flows client service 109 communicates the next-hop change to the offloaded flows server service 110 at stage C. In response to the communication from the offloaded flows client service 109, the offloaded flows server service 110 updates the flow table in the packet forwarding engine 119 to indicate the new next-hop for the flow.

Figure 3:
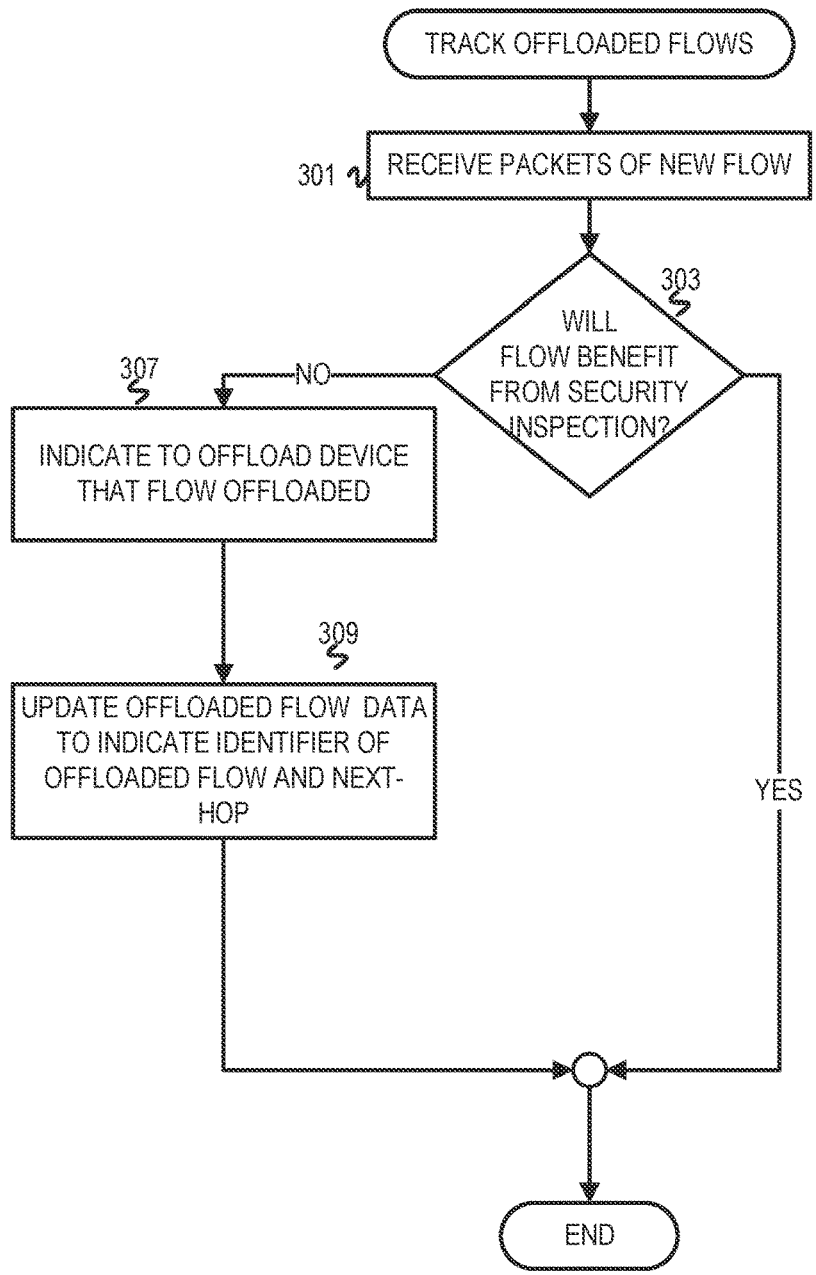
FIG. 3 is a flowchart of example operations for tracking offloaded flow data in a data store.
Figure 4:
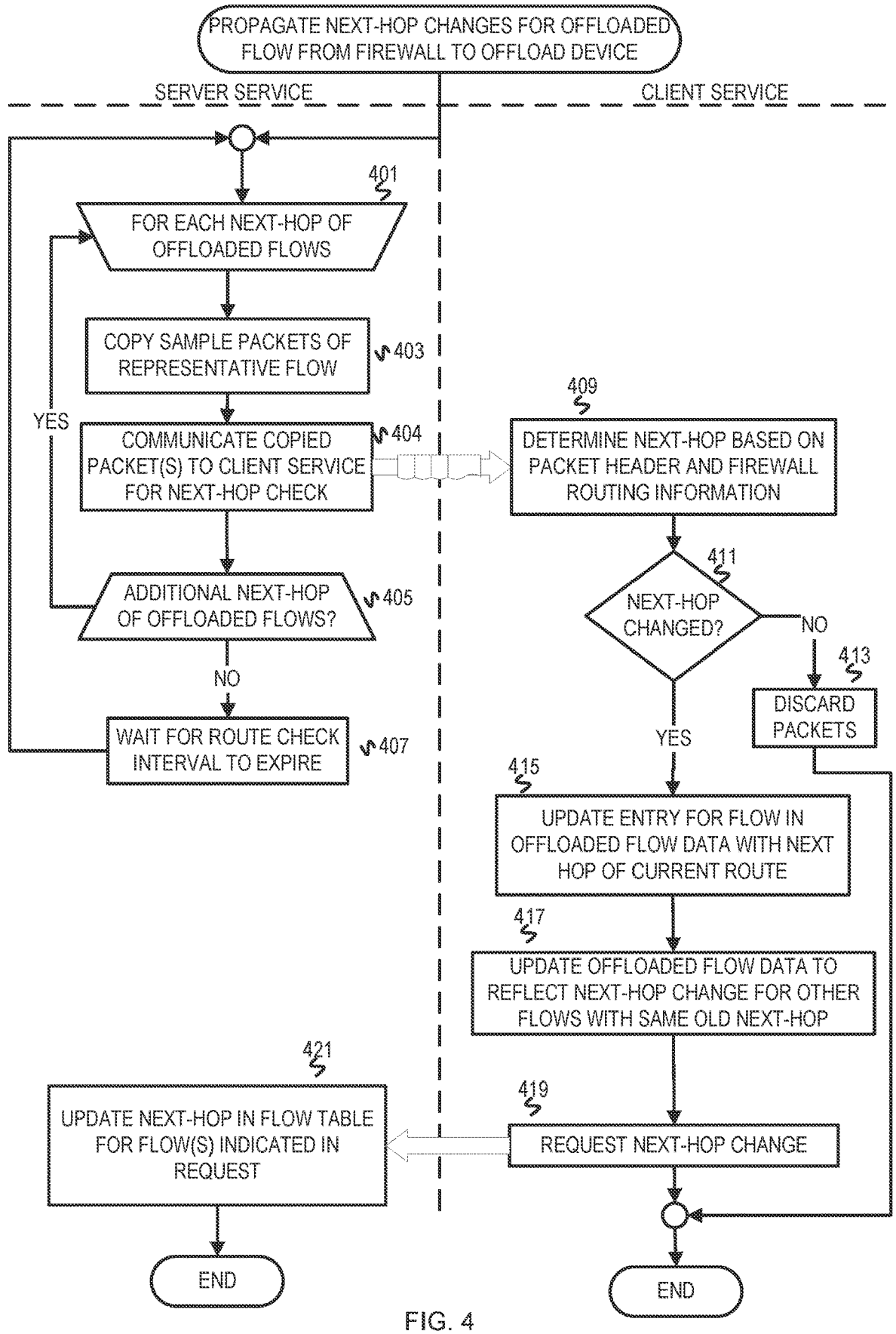
FIG. 4 is a flowchart of example operations for propagating next-hop changes for offloaded flows from the firewall to the offload device.

FIGS. 3 and 4 are flowcharts that encompass example operations by a service associated with a firewall and a corresponding service on an offload device communicatively coupled with the firewall. The example operations are described with reference to a firewall, a client service, and a server service for consistency with the earlier figures and/or ease of understanding. The name chosen for the program code is not to be limiting on the claims. For instance, while firewall is a traditional name for program code implementing security inspection of network traffic, names including "security appliance", "traffic monitor," and various proprietary names have also been used. Structure and organization of a program can vary due to platform, programmer/architect preferences, programming language, etc. In addition, names of code units (programs, modules, methods, functions, etc.) can vary for the same reasons and can be arbitrary. In addition, the client service is described as on a firewall.

FIG. 3 is a flowchart of example operations for tracking offloaded flow data in a data store. The data store is a data structure in a memory space/region allocated to the client service which may be a sub-space of the memory allocated to the firewall or a distinct memory allocation to the client service. The client service or stub can be implemented according to an inter-process communication paradigm, such as the gRPC framework.

At block 301, a firewall receives packets of a new flow. The firewall attempts to look up a flow for the packets in a flow table. When no entry is found, the flow is deemed a new flow for the firewall.

At block 303, the firewall determines whether the flow will benefit from security inspection. The firewall makes the determination based on a defined security policy and attributes of the flow as determined from the packets. If the flow cannot benefit from security inspection, then operational flow proceeds to block 307. If the flow can benefit from security inspection, then operational flow ends because the default flow table entry is set to cause the offload device to forward traffic to the firewall for inspection.

At block 307, the firewall indicates to the offload device that the flow is being offloaded to the offload device. To indicate the offload, the firewall communicates to the offload device a flow identifier and a next-hop for the flow as determined with the routing information of the firewall. An server service that was launched on the offload device based on the client service on the firewall updates its data store to indicate the offloaded flow.

At block 309, the firewall sends a request to the client service to update the offloaded flow data to indicate the offloading. The firewall sends a request indicating the flow identifier and the next-hop for the offloaded flow according to the routing information of the firewall.

FIG. 4 is a flowchart of example operations for propagating next-hop changes for offloaded flows from the firewall to the offload device. FIG. 4 depicts a column of operations for the server service and a column of operations for the client service. A dashed line separates the different flows with arrows illustrating the interaction between the services.

At block 401, the server service begins processing offloaded flows per next-hop to capture any next-hop changes. While the server service could iterate over each offloaded flow, flows will have a next-hop in common. If that next-hop has changed, the change impacts the flows that shared the next-hop. Thus, the server service can select a representative flow for each next-hop of the offloaded flows, such as the first established or first indicated offloaded flow for the next-hop. The server service can maintain a data store with data indicating the offloaded flows keyed or indexed by next-hop identifiers. In this case, the server service can iteratively select entries by next-hop identifier.

At block 403, the server service copies a sample of one or more packets of a representative flow. For instance, the server service selects a first flow identifier of a selected next-hop identifier in the data tracked for offloaded flows. The sample size can be configurable or hard-coded, for instance a sample size of 1. To copy the sample of packets, the server service accesses a transmit buffer in the packet forwarding engine. The packet forwarding engine can maintain a buffer for each flow or access specific flows with pointers into a buffer(s).

At block 404, the server service communicates the copied packet(s) to the client service for a next-hop check. The server service sends a notification with the copied packet(s) to the client service. The server service operates asynchronously and continues without waiting for a response from the client service.

At block 405, the server service determines whether there is an additional next-hop of offloaded flows to process. If so, operational flow returns to block 401. Otherwise, operational flow proceeds to block 407.

At block 407, the server service waits for expiration of a route check interval. The interval for periodic checking of a next-hop change can be configurable.

Receipt of copied packets from the server service causes the client service to perform operations to check for a next-hop change. At block 409, the client service determines a next-hop for a copied packet based on packet header information and firewall routing information. The client service can look up a next-hop with a destination address extracted from the header of the packet. In advance, the client service can be registered with the firewall to have permission to directly access routing information in a control plane of the firewall.

At block 411, the client service determines whether there has been a next-hop change for the flow of the copied packets. The client service extracts information from the copied packet for flow identification. With the flow identifier, the client service reads an entry in the offloaded flow data maintained by the client service. If the next-hop from the routing table matches, then the next-hop has not changed. If the next-hop has changed, then operational flow proceeds to block 415. If not, operational flow proceeds to block 413.

At block 413, the client service discards the packets. No response is required to be returned to the server service.

At block 415, the client service updates an entry in the offloaded flow data for the flow to indicate the next-hop of the current route. The current route is indicated in the routing information of the firewall and includes the "new" next-hop. This next-hop is new from the perspective of the offload device and the offloaded flow data but is not necessarily new from the perspective of the firewall.

At block 417, the client service updates entries in the offloaded flow data that indicate the old next-hop to replace the old next-hop with the new next-hop. Again, flows with a common next-hop will be similarly impacted by the next-hop change. Thus, the client service can update the entries for other flows in the offloaded flow data to indicate the new next-hop instead of repeating the operations for each flow that shares the next-hop.

At block 419, the client service communicates the next-hop change to the server service. The client service can communicate the next-hop change in a request for the server service to update the next-hop with a new, for example, medium access control (MAC) address. The request from the client service indicates the flow identifier of the flow of the copied packets and the new next-hop. Implementation can instead include the new and the old next-hop in the response.

At block 421, the server service updates the next-hop in the flow table on the offload device for the flow(s) indicated in the change request from the client service. The server service identifies offloaded flows impacted by the next-hop change and causes the flow table to be updated accordingly. If the server service has permission, the server service can access the flow table on the offload device and update each flow table entry corresponding to the impacted flows to indicate the new next-hop. Otherwise, with a function call or inter-process communication, the server service causes the offload device to update its flow table accordingly. The server service also updates the offloaded flow data it maintains at the offload device. If the client service response communicates the next-hop change with the old and new next-hop, then the server service can access its offloaded flow data by the old next-hop and update the entry with the new next-hop. The server service can then retrieve flow identifiers associated with the new next-hop and update the flow table entries accordingly. If the client service communicated the next-hop change with the new next-hop and the flow identifier, then the server service can look up the old next-hop indicated on the offload device for the flow identifier, and then use the old-next hop to determine other impacted flows. If the server service does not have permission to update the flow table, then the server service can invoke an exposed method/function call to request the update be made by the packet forwarding engine. Whichever implementation is used to communicate a next-hop change, the client service on the firewall awaits a response to the request for the server service to update the offload device based on the next-hop change. The server service will respond with an indication of success or failure. If server service fails, then the client service will retry a configured number of times. A timeout can also be implemented that triggers the retries. Upon exhaustion of the retries, the client service will cause the firewall to instruct the offload device to revert the offload flow corresponding to the failed next-hop update to the inspection path (i.e., the offload device will transmit the flow to the firewall).

Variations

The examples described presume a host that encompasses the firewall and the offload device. However, embodiments are not so limited and can use an offload device that is physically distinct from the firewall or host of the firewall. For instance, the offload device can be an external switch or router.

The examples are described with reference to services which are typically viewed as a process separate from a process using the service. However, an implementation may include the functionality as part of the firewall program. In this case, the example operations could be described as performed by a thread of the firewall.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 307 and 309 can be performed in reverse order or in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
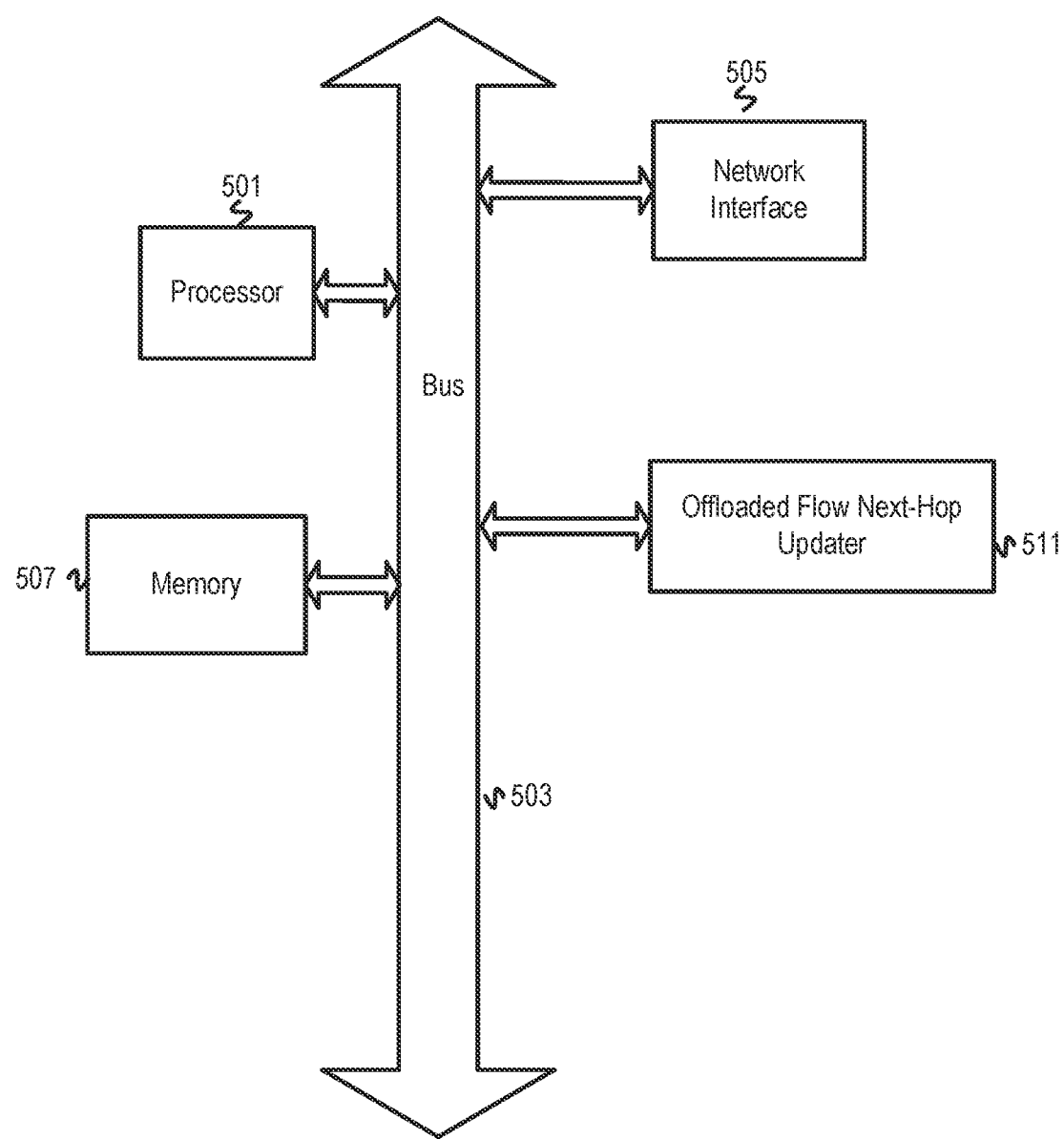
FIG. 5 depicts an example computer system with an offloaded flow next-hop updater.

FIG. 5 depicts an example computer system with an offloaded flow next-hop updater. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes offloaded flow next-hop updater 511. The offloaded flow next-hop updater 511 launches a process on an offload device and another process in a same execution space as a firewall. The process in the same execution space as the firewall can be on a virtual machine supporting the firewall or in a container that hosts the firewall, as examples. This process will be referred to as the firewall associated process. These processes maintain local data that tracks offloaded network traffic flows. The tracking data includes flow identifiers and next-hops for the flows. To balance ensuring current next-hops against expending resources for infrequent route changes that impact the next-hop, the process on the offload device periodically communicates samples of flows (i.e., packets of the flows) for periodic next-hop checks. In response to those samples, the firewall associated process looks up a next-hop in a routing table of the firewall for the samples and looks up the next-hop indicated for the corresponding flows in the offloaded flow data maintained by the firewall associated process. The firewall associated process compares the next-hops to determine whether a next-hop change has occurred. If there has been a change, the change is propagated to the offload device. The firewall associated process updates its offloaded flow data and communicates the change to the process of the offload device, which triggers updates in the flow table of the offload device and the offloaded flow data of the processes on the offload device. The offloaded flow next-hop updater 511 is program code to launch the client and server services as well as the code implementing those services. While depicted on a same computer system, the server service may be launched on an offload device that is separate from the host of the firewall associated with the client service. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:
    for network traffic flows that have been offloaded from a firewall to an offload device, communicating copies of a sampling of packets of at least a subset of the offloaded network traffic flows from the offload device to the firewall;
    for each of the copied packets communicated to the firewall,
        determining whether a next-hop for the copied packet has changed based on routing information of the firewall;
        based on a determination that the next-hop for the copied packet has not changed, discarding the copied packet; and
        based on a determination that the next-hop for the copied packet has changed, communicating the changed next-hop to the offload device and accordingly updating on the offload device the next-hop indicated for the one of the subset of offloaded network traffic flows corresponding to the copied packet.

2. The method of claim 1 further comprising determining a representative traffic flow for each set of the offloaded network traffic flows that has a common next-hop, wherein copying samples of packets from the subset comprises copying samples of packets from the representative traffic flows.

3. The method of claim 1, wherein communicating the copied packets from the offload device to the firewall comprises a first service on the offload device communicating the copied packets to a second service on the firewall, wherein communicating the changed next-hop to the offload device comprises the second service communicating the changed next-hop to the first service.

4. The method of claim 1, wherein determining, for each of the copied packets, whether a next-hop for the copied packet has changed comprises inputting the copied packet into a forwarding data plane of the firewall to obtain a current next-hop and comparing with a previously indicated next-hop locally stored in association with an identifier of the one of the offloaded network traffic flows corresponding to the copied packet.

5. The method of claim 1, wherein determining, for each of the copied packets, whether a next-hop for the copied packet has changed comprises looking up a next-hop currently indicated in the firewall for the one of the offloaded network traffic flows corresponding to the copied packet and comparing with a next-hop indicated in the offload device for the one of the offloaded network traffic flows corresponding to the copied packet.

6. The method of claim 1, further comprising the firewall maintaining a store of data associating flow identifiers of offloaded network traffic flows with corresponding next-hops.

7. The method of claim 6, wherein maintaining the store comprises organizing the data to be accessible by flow identifier or next hop and grouping flow identifiers by common next-hop.

8. The method of claim 6, wherein maintaining the store comprises updating the data to indicate a change in next-hop for an offloaded network traffic flow when a new route is detected for the offloaded network traffic flow by the firewall.

9. A non-transitory machine readable medium having program code stored thereon, the program code comprising instructions to:
 for network traffic flows that have been offloaded from a firewall to an offload device, copy a sampling of packets from a subset of the offloaded network traffic flows;
 communicate the copied packets from the offload device to the firewall;
 for each of the copied packets,
  determine whether a next-hop for the copied packet has changed based on routing information of the firewall;
  based on a determination that the next-hop for the copied packet has not changed, discard the copied packet; and
  based on determination that the next-hop for the copied packet has changed, communicate the changed next-hop to the offload device and accordingly update on the offload device the next-hop indicated for the one of the subset of offloaded network traffic flows corresponding to the copied packet.

10. The non-transitory machine readable medium of claim 9, wherein the program code further comprises instructions to determine a representative traffic flow for each set of the offloaded network traffic flows that has a common next-hop, wherein the instructions to copy samples of packets from the subset comprise instructions to copy samples of packets from the representative traffic flows.

11. The non-transitory machine readable medium of claim 9, wherein the instructions to determine, for each of the copied packets, whether a next-hop for the copied packet has changed comprise instructions to input the copied packet into a forwarding data plane of the firewall to obtain a current next-hop and to compare with a previously indicated next-hop locally stored in association with an identifier of the one of the offloaded network traffic flows corresponding to the copied packet.

12. The non-transitory machine readable medium of claim 9, wherein the instructions to determine, for each of the copied packets, whether a next-hop for the copied packet has changed comprise instructions to look up a next-hop currently indicated in the firewall for the one of the offloaded network traffic flows corresponding to the copied packet and to compare with a next-hop indicated in the offload device for the one of the offloaded network traffic flows corresponding to the copied packet.

13. The non-transitory machine readable medium of claim 9, wherein the program code further comprises instructions to maintain, on the firewall, a store of data associating flow identifiers of offloaded network traffic flows with corresponding next-hops.

14. The non-transitory machine readable medium of claim 13, wherein the instructions to maintain the store comprise instructions to organize the data to be accessible by flow identifier or next hop and grouping flow identifiers by common next-hop.

15. The non-transitory machine readable medium of claim 14, wherein the instructions to maintain the store comprise instructions to update the data to indicate a change in next-hop for an offloaded network traffic flow when a new route is detected for the offloaded network traffic flow by the firewall.

16. An apparatus comprising:
 an offload device including a first processor and first machine readable media having stored thereon a first program code executable by the first processor to cause the offload device to,
  for network traffic flows that have been offloaded from a firewall to offload device, copy samples of packets from a subset of the offloaded network traffic flows;
  communicate the copied packets from the offload device to the firewall; and
  based on a communication from the firewall that indicates a changed next-hop for at least one of the offloaded network traffic flows, update the next-hop for the at least one of the offloaded network traffic flows according to the changed next-hop that was communicated;
 a second processor; and
 second machine readable media having second program code stored thereon, the second program code comprising instructions executable by the second processor to cause the apparatus to instantiate the firewall and to,
  for each of the copied packets communicated from the offload device,
   determine whether a next-hop for the copied packet has changed based on routing information of the firewall;
   based on a determination that the next-hop for the copied packet has not changed, discard the copied packet; and
   based on determination that the next-hop for the copied packet has changed, communicate the changed next-hop to the offload device.

17. The apparatus of claim 16, wherein the first program code further comprises instructions to determine a representative traffic flow for each set of the offloaded network traffic flows that has a common next-hop, wherein the instructions to copy samples of packets from the subset comprise instructions to copy samples of packets from the representative traffic flows.

18. The apparatus of claim 16, wherein the instructions to determine, for each of the copied packets, whether a next-hop for the copied packet has changed comprise instructions to input the copied packet into a forwarding data plane of the firewall to obtain a current next-hop and to compare with a previously indicated next-hop stored on the firewall in association with an identifier of the one of the offloaded network traffic flows corresponding to the copied packet.

19. The apparatus of claim 16, wherein the instructions to determine, for each of the copied packets, whether a next-hop for the copied packet has changed comprise instructions to look up a next-hop currently indicated in the firewall for the one of the offloaded network traffic flows corresponding to the copied packet and to compare with a next-hop indicated in the offload device for the one of the offloaded network traffic flows corresponding to the copied packet.

20. The apparatus of claim 16, wherein the second program code further comprises instructions to maintain a store of data associating flow identifiers of offloaded network traffic flows with corresponding next-hops, wherein the instructions to maintain the store of data comprise instructions to, organize the data to be accessible by flow identifier or next hop and grouping flow identifiers by common next-hop; and update the data to indicate a change in next-hop for an offloaded network traffic flow when a new route is detected for the offloaded network traffic flow by the firewall.

\* \* \* \* \*